United States Patent [19]

Book

[11] 4,050,863

[45] Sept. 27, 1977

[54] APPARATUS FOR THE HOT-PRESSING OF COMPOSITE BOARDS MADE FROM LIGNOCELLULOSIC MATERIAL

[75] Inventor: Nils Evert Erling Book, Motala, Sweden

[73] Assignee: Aktiebolaget Motala Verkstad, Motala, Sweden

[21] Appl. No.: 636,671

[22] Filed: Dec. 1, 1975

[30] Foreign Application Priority Data

Dec. 4, 1974 Sweden ................................ 7415215

Mar. 5, 1975 Sweden ................................ 7502463

[51] Int. Cl.[2] ................................................ B29C 3/00

[52] U.S. Cl. ........................................ 425/84; 425/406

[58] Field of Search ..................... 425/84, 85, 86, 412, 425/406, 455; 100/196, 110, 116

[56] References Cited

U.S. PATENT DOCUMENTS

| | | | |
|---|---|---|---|
| 445,939 | 2/1891 | Monk | 425/455 |
| 2,007,063 | 7/1935 | Rolland | 425/84 |
| 2,975,470 | 3/1961 | Snelson et al. | 425/85 X |
| 3,099,061 | 7/1963 | Marchioli et al. | 425/84 |
| 3,118,229 | 1/1964 | Rossen | 425/84 |
| 3,307,236 | 3/1967 | Sirera | 425/84 |
| 3,672,056 | 6/1972 | Barbier et al. | 425/84 |

*Primary Examiner*—Robert L. Spicer, Jr.
*Attorney, Agent, or Firm*—Dressler, Goldsmith, Clement, Gordon & Shore, Ltd.

[57] ABSTRACT

In a method of heat-pressing sheets of lignocellulosic material the sheets are placed on combined conveying and draining plates externally of a hot press and are charged to and pressed in the press while supported by the plates. Draining of gas or liquid and vapor is effected vertically through the conveying and draining plates at a low temperature. Then the gas or liquid and vapor is drained horizontally through passages arranged in the surfaces of press plates adjacent the sheets.

5 Claims, 8 Drawing Figures

APPARATUS FOR THE HOT-PRESSING OF COMPOSITE BOARDS MADE FROM LIGNOCELLULOSIC MATERIAL

The present invention relates to a method and an apparatus for the hot-pressing of composite sheet material comprising lignocellulosic material such as wood chips, wood fibre, into boards in presses having preferably heated press-plates between which the sheets are fed and subjected to de-watering or de-gassing and steam-removal processes under pressure and heat.

One normal method of manufacturing wood fibreboard is to wet-form fibre sheets in a pick-up machine and to then convey the sheets into a press comprising one or more storeys and to press said sheets between press-plates normally heated to a temperature of approximately 200° C, de-watering of the sheets, the removal of steam and drying of the sheets being effected in the press under pressure and the supply of heat.

For this purpose two principal methods are known for charging and draining operations, both of which methods require the fibre sheets to be placed on draining wires through which liquid is drained from the sheets as they are pressed and through which steam generated by the heat to which the sheets are subjected is also conducted. According to one of these methods, draining wires are used without underlying conveying plates for conveying the sheets into and out of the press. According to the other of said methods, which is the most commonly used, conveying plates are used underneath the draining wires, the conveying plates being present in the press during a sheet-pressing operation.

When pressing a sheet, it is desired that the liquid contained therein is pressed out quickly and as effectively as possible and that the sheet is then subjected to the shortest possible drying time. The surface pressure used to force liquid out of the sheet lies around 5 megapascal.

The draining wires offer a relatively high resistance to the flow of liquid from a sheet during a sheet-pressing operation, thereby counteracting a rapid pressing operation and giving rise to a number of different disadvantages.

Since the pattern of a draining wire is imprinted on the back surface of the fibreboard adjacent thereto during a pressing operation, the greatest depth of said imprint being approximately equal to the diameter of the wire from which said draining wires are made, it is desired to use as fine a wire as possible, so as to obtain a fine back surface on the pressed board. For this reason there are often used draining wire having a wire diameter of approximately 0.3 mm and nine straight warp threads and nine weft threads per $cm^2$. Draining wires having a coarser wire than 0.5 mm and fewer than seven straight warp threads and seven weft threads per $cm^2$ are seldom used.

In a de-liquefying and de-steaming operation, the liquid and steam must first pass vertically through the draining wire and then horizontally through the passages formed between the wire and the press-plate or the conveying-plate respectively when such a plate is used. These passages are in themselves extremely narrow and as a result of repeated constrictions at the intersections of the warp and weft wires a large resistance to flow is presented. The horizontal passage area increases with an increase in the wire diameter and decreases with an increased number of threads per $cm^2$. When, in order to obtain a fine surface on the back side of the board, the number of wires per $cm^2$ is increased and finer wires are selected, the horizontal draining area will be greatly reduced. In addition the number of intersections is increased, i.e. the number of constrictions per unit of length, which also impairs the draining ability.

Over recent years the requirement for wider board has meant that the width of the presses has increased and therewith the width of the sheet and draining wires without increasing the coarseness of the draining wires, whereby the resistance to flow in said wires has now reached a magnitude such as to represent a serious problem.

The draining wires are subjected to wear and tear against the conveying plates and the press plates respectively. In the case of a draining wire composed of 0.5 mm wires a wear on the surfaces of the wires against the surface supporting said wires of, for example, 0.2 mm means a 40 % reduction in the areas of the horizontal passages between the draining wire and said supporting surface. Since, from the practical aspect, it is necessary to change the draining wires as they become damaged or worn, the result is that gradually wires worn to different degrees will be present in a multi-storey press during one and the same pressing operation. Thus, in this case there will be obtained corresponding variations in flow resistance and in the degree to which the sheets are de-watered in respect of individual sheets, which will result in drying times of different lengths for respective sheets and also to variations in thickness of pressed board.

By way of summary it can be said that the high resistance to flow of the draining wires presents the following disadvantages:

The closing speed of the press must be reduced and the first pressing stage is effected slowly to avoid the edges of the sheet from being torn by the outflowing liquid and steam.

As the pressure continues to rise, the specific pressure on the water in the wire becomes so high that the hot press-plate or the conveyor-plate is wetted by the liquid, causing cooling of the sheet to be ununiform since the central portions of the sheet are cooled o a lesser degree than the remaining portions thereof since smaller quantities of liquid pass over these surfaces.

As a result hereof the central portions of the sheet become hotter than the peripheral portions thereof, and hence the resistance to compression forces is lower because the wood fibres are rendered soft by the hot liquid, and the sheets are thinner in the centre portions thereof than the outer portions due to springback from surface plates located above the sheets and the intermediate draining wires lying thereon.

However, owing to the face that the temperature of the sheets quickly becomes very high, a lowering of the pressure must be undertaken to avoid the sheets from burning fast to the surface plates.

When lowering said pressure the surface pressure becomes so low in the central portions of the sheet that in inner higher vapour pressure in the sheet often causes lamination or bubbles in the upper surface thereof.

The vapour pressure in the draining wires is high, causing a similarly high vaporising temperature, the flow of heat per unit of time from press plate to sheet being low and the drying time long as a consequence thereof.

When pressing a sheet, wood fibres fasten in the draining wires, which locally impair the draining capacity of the wires, rendering it necessary to frequently brush said wires. The woven structure of the draining wires causes the wires to be difficult to clean by brushing and consequently it is often necessary to burn away fibres stuck to said wires with a gas flame, creating a risk of damaging the wire.

A draining wire has a short useful life and the cost of replacing the draining wire is commensurately high.

When the use of extremely fine draining wires is required, it is known to use a coarse wire under the fine wire in order to make draining possible at all, or to use a double-woven wire having an upper surface which is denser than the lower surface. The difficulties encountered with cleaning and handling of such wires etc. means that these wires can only be used when requirements with respect to the board cannot be fulfilled in any other way.

With the in-feeding of conveyor plates, attempts have been made to place on the conveyor plates coarse draining wires with draining plates placed thereon, the fibre sheet being placed either directly on the draining plate or a normal draining wire being placed between the sheet and said draining plate. This requires, however, a large amount of handling work when cleaning during pressing operations and a lengthening of the heating time of the sheets owing to the increased quantity of cold materials introduced into the press, and additionally an increase in the heat transport path between a press plate and the sheet.

An embodiment of a draining plate is disclosed in Swedish Pat. No. 315,479. With respect to the general embodiment according to claim 1 of said Patent the comments made above with respect to draining plates applies. With respect to the embodiments according to claim 2 of the patent, the grooves 6 on the under surface of the plate cause an increase in the thickness of said plate such that wood fibres fastened in or stuck to the narrow slots cannot be readily removed therefrom, said slots, in order to fulfil their intended purpose, being extremely narrow.

It is known from German Pat. No. 1,223,146, claim 4, to use in a pre-press on the underneath of the press plates degassing plates provided with grooves which are convered by a circumferentially-extending wire cloth in the press storey during the charging of a sheet to the press. Such an arrangement, however, does not eliminate the disadvantages overcome by the method of use according to the present invention. The circumferentially-extending wire cloth cannot simultaneously comprise wires of the fineness required with respect to the depth to which the pattern of the wire is imprinted into the sheet and yet be rigid enough to overbridge a reasonable width on the grooves in the de-gassing plate without being permanently deformed at the surface pressures to which the sheet is experienced in an apparatus according to the present invention. Furthermore, the arrangement causes a wire pattern to be imprinted on both sides of the sheet, while normally at least one smooth slide is desired on the board. Neither is the arrangement according to said Patent intended to be used in conjunction with a method according to the present invention.

The present invention is intended to eliminate the aforementioned disadvantages encountered with known embodiments.

The invention is based on the concept of replacing the woven draining wires with draining plates comprising wires which have preferably a round section and a diameter, for example, of 3 mm, and which are densely arranged in one plane, the distance between the wires being, for example some tenths of a millimetre and the wires being held in position at the selected distances apart as by welding. In this way it is possible to arrange in the press plates suitable passages for horizontal drainage, since the wires are sufficiently rigid to be able to overlap passages without being permanently deformed by the pressure exerted by the press. With such draining plates the resistance to flow when draining gas or liquid and steam is particularly low and is the same over the total area of the sheet. The sheets are conveyed into and out of a press whilst resting on the draining plates.

As a result of the much larger abutment surface between the wires of the draining plate and the sheet as compared with the corresponding surface of a conventional draining wire, the depth to which the wires are pressed into the adjacent surface of a sheet is infinitesimal and can further be improved by face-grinding the surface of the draining plate against which a sheet is to rest, subsequent to welding the wires in place.

It is important that fibres etc. which have become welded to the plate during a pressing operation can be readily removed from both sides of the plate between pressing operations by automatically brushing the plates. This is greatly facilitated by the present invention, owing to the fact that the gaps between the wire widen towards both sides and no obstructing transversely-extending wires are present. In accition the distance between the welds is selected so that a certain flexibility is obtained between the separate wires during a brushing operation.

An embodiment of the invention will now be described with reference to the accompanying drawing, in which:

FIG. 3 shows diagrammatically an alternative embodiments of the plate shown in FIG. 2;

Figure 1:
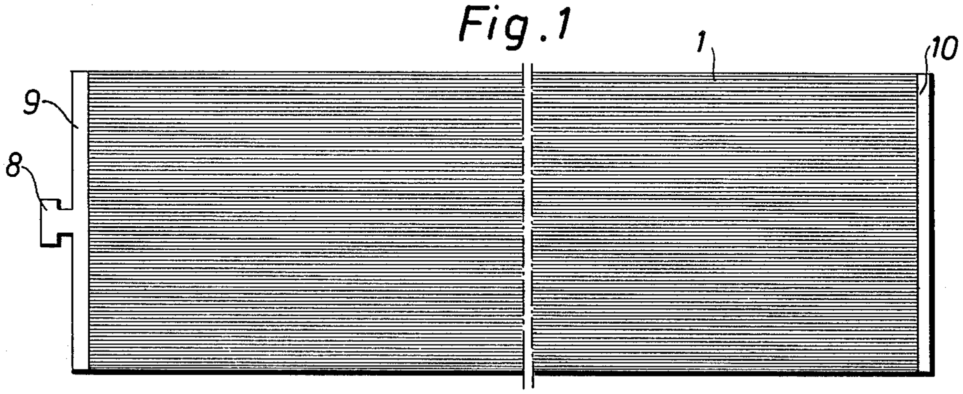
FIG. 1 is a diagrammatic view of a conveying and draining plate comprising wires.
Figure 2:
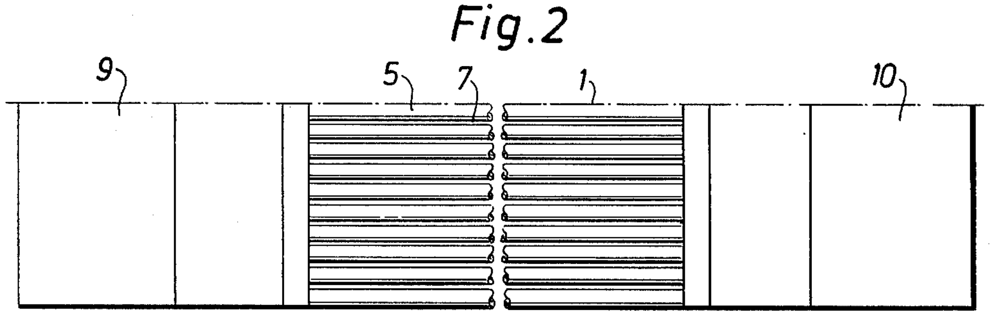
FIG. 2 shows diagrammatically a portion of the conveying and draining plate shown in FIG. 1.
Figure 3:
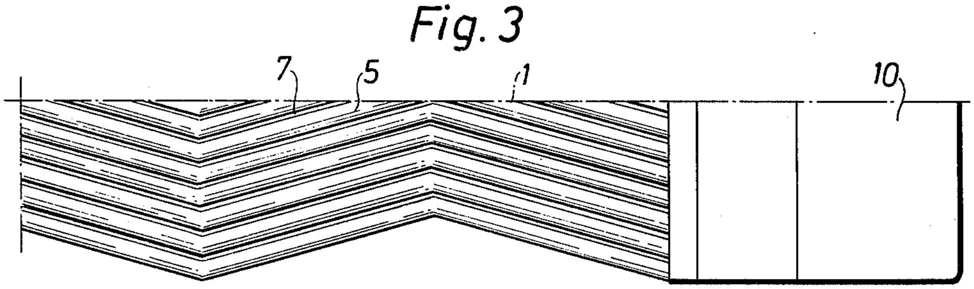
FIG. 3 shows diagrammatically an alternative embodiment of the plate shown in FIG. 2.
Figure 4:
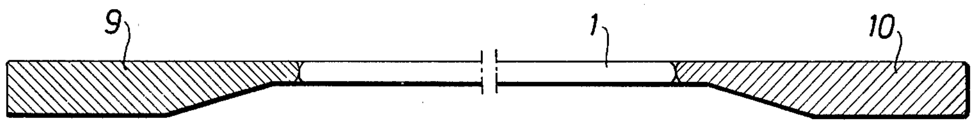
FIG. 4 is a diagrammatic sectional view through a conveyor plate.

A conveying and draining plate 1 comprises wires 5, preferably hard-drawn acid-proof steel wire having a diameter of, for example, 3 mm. According to one embodiment, the wires, for example, may be bent in the horizontal plane to a zig-zag configuration with a suitable angle between the sides, which may have a length of approximately 200 mm. The wires are laid together in the horizontal plane so as to be, for example, 0.3 mm apart and are attached together at the apecies of the angles by means of, for example, a stainless hard weld. The wires 5 may have a variety of shapes, such as wave-shape etc. which can fit into each other. The wires may also be completely straight in the longitudinal direction, the transverse direction or the diagonal directions of the plate 1. They are fastened together at a suitable distance apart by, for example, stainless hard welds. The length of the conveying and draining plate is slightly longer than the length of a corresponding press plate 4 and the width is slightly greater than the width of the sheet 2. At the short ends of the plate there are provided stiffening members 9 and 10 and a drawing means 8.

The conveying and draining plate 1 may also comprise a plate having, for example a thickness of 3 mm, in which plate slots 7 are arranged. The slots are made narrower in the upper surface of the plate and preferably widened towards the under surface of said plate. The density and direction of the slots can be selected so that a plate corresponding to the structure of the wire conveying and draianing plate is obtained. It is, however, difficult from a manufacturing aspect to provide wave-shaped slots.

Figure 6:
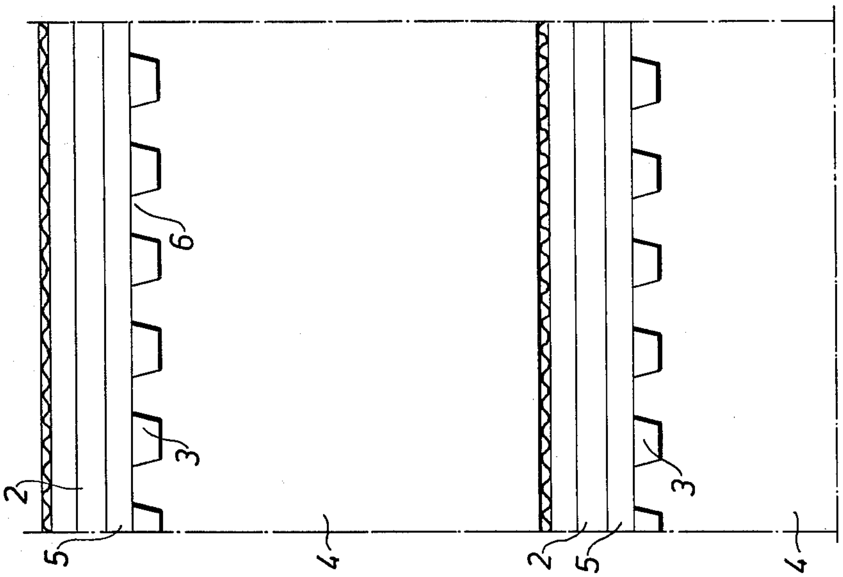
FIG. 6 is a diagrammatic end view taken on the line A—A of FIG. 5.
Figure 5:
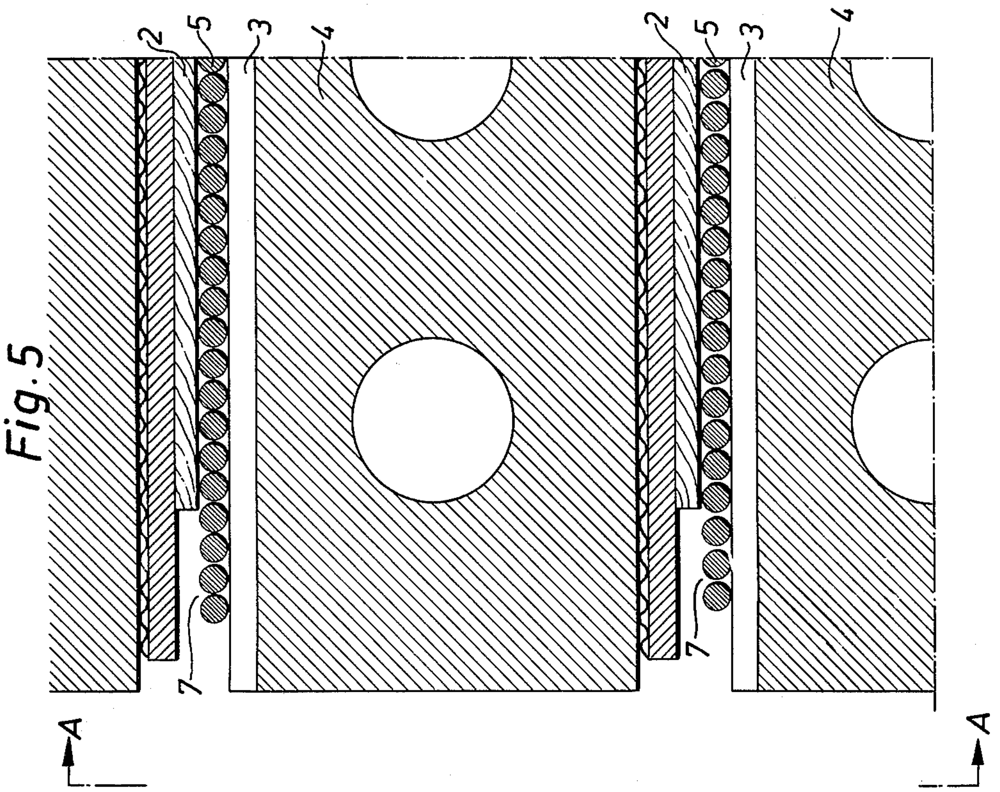
FIG. 5 is a diagrammatic sectional view through a portion of a hog press during a pressing operation.

Press plates 4 in a press (FIGS. 5–6) on which conveying and draining plates 1 are arranged are provided with passages 3 for conducting away gas, liquid or steam drained from a sheet 2 through the conveying and draining plates 1. The passages 3 may be formed directly in the material of the press plate 4 or in a plate fastened to said press plate. The passages 3 may also have the form of the spaces between ribs 6 attached to the press plates, for example, by welding. The passages 3 may, for example, have a depth of 5 mm, a width of 7 mm and a spacing of, for example, 15 mm. The direction in which the passages 3 extend in the upper surface of the press plate is selected with respect to the slots 7 of the conveying and draining plate 1, preferably so that they do not intersect each other. The passages 3 can therefore extend in the longitudinal direction, the transverse direction of the diagonal direction etc. of the press plates.

The charging of a hot press provided with the afore-described arrangements is effected by placing the sheet 2 on the transport and draining plate 1 and to introduce said sheets and said plate into the press in a known manner. Pressing of the sheets 2 is also effected in a known manner.

Figure 8:
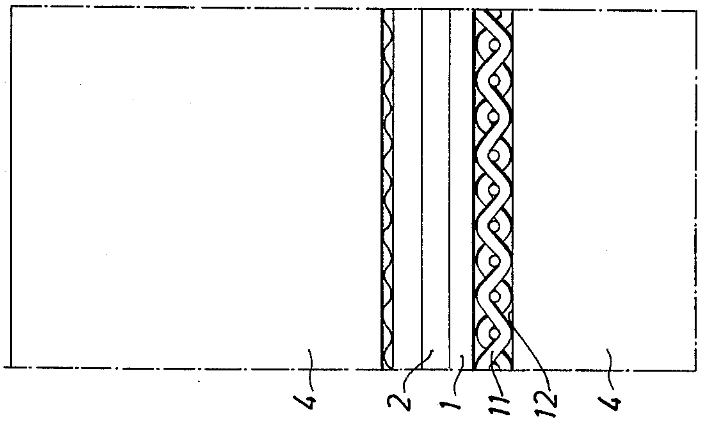
FIG. 8 is a diagrammatic end view taken on the line B—B in FIG. 7.
Figure 7:
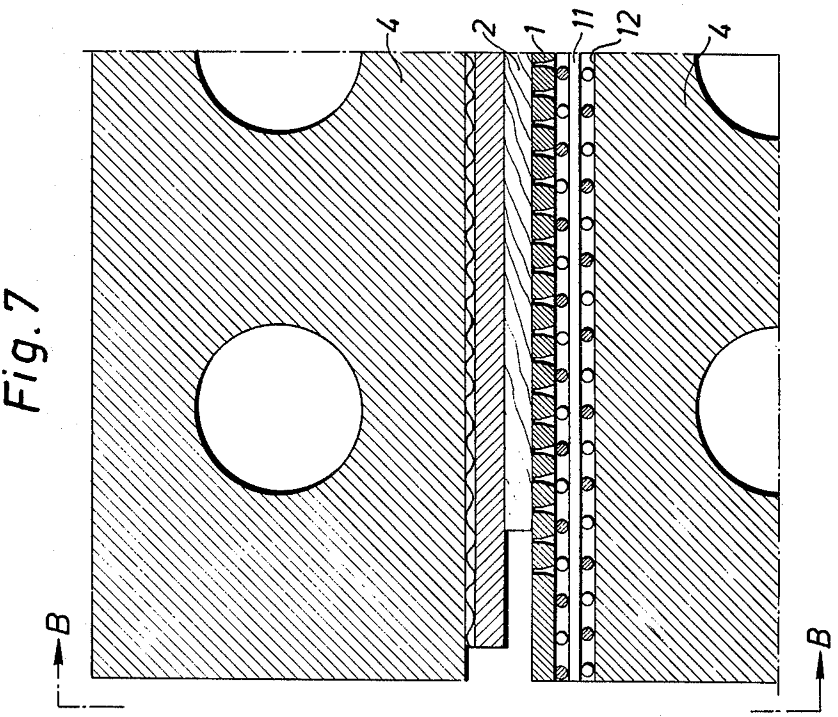
FIG. 7 is a diagrammatic sectional view through a portion of a hot press during a pressing operation in accordance with a further alternative.

A further embodiment of the invention is shown in FIGS.7–8. On press plates 4 in a press there is arranged a wire or the like 11 which forms passages 12 against the press plate 4. Gas, liquid or steam drained from the sheets 2 is conducted horizontally through the conveying and draining plates 1 and the passages 12 in the wire.

By means of the present invention, there is obtained large horizontal passages beneath the sheets 2 in the press, wherewith the resistance to flow therein is so low as to be negligible. The following advantages are obtained:

1. The press can be closed and the pressure rapidly increased without the risk of tearing the edges of the sheets.

2. Liquid can be pressed from the sheets readily and quickly as a result of the low resistance to flow.

3. Draining is uniform over the whole area of the sheets.

4. The pressure of the liquid against the hot press plate is so low that the liquid is unable to wet the plate, thereby cooling of the press plate is negligible and the pressed-out liquid is only negligibly heated.

5. Appreciable temperature increase above +100° C in the wet zone of the sheet is not possible, since the liquid boils off at a substantially atmospheric pressure, whereby the risk of the sheet being heat-welded to the surfaces of the plates is eliminated and a high surface pressure can be maintained on the sheets subsequent to pressing out liquid therefrom.

6. The risk of the pressed boards splitting when the pressure is lowered is eliminated since the vaporising pressure is extremely low.

7. The pressed boards are of uniform thickness as a result of the uniform draining and heat distribution within both the individual storeys of the press and between said storeys.

8. The pressing time is considerably shorter as a result of the rapid and more effective expulsion of liquid from the sheets. The press plates are hotter when drying commences and a smaller quantity of liquid need be vaporised. Vaporisation takes place at such a low temperature that a higher difference in temperature is obtained with respect to the temperature of the press plate, wherein the flow of heat per unit of time is high.

9. The amount of heat consumed for each board produced is lower as a result of the more effective expulsion of liquid from the sheets and the low extent to which the expelled liquid is heated.

The invention is not restricted to the described method but includes other methods in which, in accordance with the invention, rapid and uniform de-gassing or liquid expulsion and vaporisation is of consequence. Neither in the invention restricted to the embodiments illustrated, but can be modified within the scope of the following claims.

I claim:

1. Apparatus for heat-pressing sheets of lignocellulosic material in a stationary press for forming lignocellulosic materials into boards during which time provision is made to allow draining of liquid, gas or steam from the sheets when being pressed and heated in the press, said apparatus comprising: a pair of vertically spaced heated press plate assemblies having flat, opposed, horizontally parallel surfaces of finite length; means in the upper surface of said lower press plate assembly defining drain passages for receiving gas, liquid or steam material compressed from said sheet and for conducting it horizontally; plate means for conveying a sheet of lignocellulosic material into the press between the opposed press plate assemblies which plate means defines interspersed rigid sheet support portions and slot portions therethrough adapted to communicate with said drain passages to permit draining from the sheets being pressed, said plate means being constructed and arranged to permit draining of any liquid, gas or steam being pressed out of the sheet while resisting plastic deformation of the sheet during the pressing action.

2. Apparatus in accordance with claim 1 in which the plate means is comprised of straight wires arranged and maintained relatively close together.

3. Apparatus in accordance with claim 1 in which the plate means is comprised of wires having a zig-zag configuration arranged and maintained relatively close together.

4. Apparatus in accordance with claim 1 in which the plate means comprises a flat plate with slots arranged therein.

5. Apparatus in accordance with claim 1 in which there is located between the plate means and the lower press plate assembly a wire mesh means which defines passages for conducting in a horizontal direction gas, liquid or vapor drained from the sheet through the conveying and draining plate means.

* * * * *